(12) United States Patent
Fandard et al.

(10) Patent No.: US 7,725,235 B2
(45) Date of Patent: May 25, 2010

(54) SLIP-CONTROL METHOD AND DEVICE

(75) Inventors: Gérard Fandard, Clermont-Ferrand (FR); Hervé Mousty, Orcet (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 623 days.

(21) Appl. No.: 10/591,018

(22) PCT Filed: Feb. 24, 2005

(86) PCT No.: PCT/EP2005/001932

§ 371 (c)(1),
(2), (4) Date: Jul. 6, 2007

(87) PCT Pub. No.: WO2005/092684

PCT Pub. Date: Oct. 6, 2005

(65) Prior Publication Data

US 2007/0289795 A1    Dec. 20, 2007

(30) Foreign Application Priority Data

Feb. 27, 2004    (FR) .................................. 04 01988

(51) Int. Cl.
*B60T 8/56*    (2006.01)

(52) U.S. Cl. .............................. 701/71; 701/74; 701/75; 701/82

(58) Field of Classification Search ................. 701/36, 701/71, 72, 73, 74, 75, 82, 85; 73/146; 702/169, 702/188; 180/197
See application file for complete search history.

(56) References Cited

U.S. PATENT DOCUMENTS

| | | | |
|---|---|---|---|
| 4,700,972 A | 10/1987 | Young | |
| 6,470,731 B1 | 10/2002 | Rieth | |
| 7,234,730 B2 * | 6/2007 | Bonutti | 280/757 |
| 7,320,246 B2 * | 1/2008 | Schick et al. | 73/146 |
| 2003/0144786 A1 | 7/2003 | Brachert et al. | |

FOREIGN PATENT DOCUMENTS

EP    0 818 372 A    1/1998

* cited by examiner

*Primary Examiner*—Richard M. Camby
(74) *Attorney, Agent, or Firm*—Cohen Pontani Lieberman & Pavane LLP

(57) ABSTRACT

A method for controlling the slip of a tire (1) of an automobile, said tire comprising a tread (3). The method comprises adjusting said slip using the measurement of a variable linked to the surface temperature ($T_2$) of the tread in the contact area (2) of the tire.

15 Claims, 3 Drawing Sheets

SLIP-CONTROL METHOD AND DEVICE

RELATED APPLICATION

This is a U.S. National Phase Application under 35 USC 371 of International Application PCT/EP2005/001932, filed on 24 Feb. 2005.

The present invention relates to the ground contact system of vehicles, in particular to the optimisation of the forces transmitted by the tires to the ground.

Numerous devices and numerous methods are known to make it possible to best use the force transmission potential of tires. One of the most widespread systems is the system known as "ABS", the function of which is to improve the braking of vehicles in particular on very slippery ground. Other systems operating on a similar principle make it possible also to improve the traction of the driving wheels. The aim of these systems is to keep the tire as close as possible to its optimum operating conditions for a given travelling situation, because it is known that the forces that a tire can transmit are limited by its grip potential.

On horizontal ground, the grip potential corresponds to the ratio between the maximum transmissible horizontal force and the vertical load borne by the tire in a given travel situation. The grip potential is often referred to as "$\mu_{max}$".

$$\mu_{max} = \frac{F_{max}}{F_z}$$

(where $F_{max}$ is the maximum horizontal force and $F_z$ the vertical load borne)

The horizontal force (F) transmitted by the tire may be a longitudinal force ($F_x$) or a transverse force ($F_y$) or a combination of both, in which case $F=\sqrt{Fx^2+Fy^2}$.

The grip potential ($\mu_{max}$) varies at each moment according to the conditions of contact between the tire and the ground. Of the parameters which are known to influence the value of $\mu_{max}$, mention may be made of the following: type of tire, internal pressure, temperatures of the tire, vertical load carried, speed of rotation, slip speed, slip ratio, type of ground, temperature of the ground, of the surrounding air, presence or absence of water on the ground, combination of the longitudinal and transverse forces.

For each set of operating conditions, and hence for each set of the parameters identified above, the transmissible horizontal force ($F_{max}$) may be determined experimentally, for example using a complete experimental program. Thus, if it were possible to have knowledge of all the parameters at each moment, the transmissible horizontal force ($F_{max}$) could be deduced therefrom at each moment. This is, however, impossible in practice because it is not possible to carry out all these measurements in real time and permanently on a commercial vehicle and a commercial tire. This is why no vehicles or systems using determination of the grip potential in real time during normal use of the vehicle are currently known.

Therefore, for want of being able to base on the effective calculation of $\mu_{max}$ using actual measurements, the known systems mentioned further above are based on the principle of regulating the slip ratio. This is because the slip ratio is a variable which is accessible in real time relatively reliably for example by measuring and comparing the speed of rotation of the various wheels of a vehicle. As the slip ratio is one of the parameters of the operating conditions which depends directly on the grip conditions, it is accepted that it is a good regulating parameter. The regulation is then directed at a slip ratio considered as being "optimal" which is supposed to correspond to optimal operation of the tire. In order to keep the slip ratio at its optimum level, either the torque transmitted to the wheels by the braking system or the torque transmitted by the engine of the vehicle or alternatively both at once is/are acted upon.

This known principle is still not entirely satisfactory. When it is desired to improve the effectiveness of the systems based on this principle, it would seem that in particular the following problem is encountered: the optimum slip ratio is not a fixed value, but also depends on the other operating conditions so that it in fact varies within wide proportions. To take account of this, systems and methods using successively several values of optimum slip ratio and/or modulating the value of optimum slip ratio used as a function of variables which can be measured in real time on the vehicle (for example, pressure of the tires, vertical load borne, speed of travel) have been developed.

The invention proposes a method for controlling the slip of a tire of an automobile, said tire comprising a tread, said method consisting of adjusting said slip using the measurement of a variable linked to the surface temperature of the tread in the area of contact of the tire with the roadway. As will be seen in the rest of the description, the principle of this adjustment is to increase the slip when the surface temperature has to be increased and to reduce the slip when the temperature has to be decreased.

In fact, it has been noted that, for a given tire, the maximum transmissible horizontal force in the contact area is obtained when the temperature of the surface of the tire in contact with the ground is kept within a relatively narrow range of variation and this temperature can be acted upon by means of the slip of the wheel.

Thus, according to the invention, it is possible to optimise the grip potential of the tire because the operating parameters of the tire are acted upon so that it operates permanently under the best thermal conditions from the point of view of grip.

Relative to the prior art, the principle of the invention differs in particular by the fact that the aim is no longer solely to exploit the whole grip potential independently of the surface temperature, but that furthermore the surface temperature of the material of the tread is acted upon in order to optimise the grip potential throughout the loading.

In order to do this, instead of aiming to obtain a given slip ratio or a slip ratio selected from among several given slip ratios, the slip is adjusted with the aim of obtaining a given temperature of the surface of the tire.

The slip, that is to say the fact that the tread of a tire slips relative to the ground when the tire transmits a force, no matter how small, may be quantified in the form of the slip speed or in the form of the slip ratio in a manner known in the field of tires.

Acting on the slip thus corresponds to increasing or reducing (in absolute value) the slip speed or the slip ratio. For stable conditions furthermore, when the slip increases, the surface temperature of the tread in the contact area increases. On the contrary, when the slip decreases, the temperature of the tread in the contact area decreases. This is due to the effect of friction.

The desired optimum temperature depends largely on the material used in the tread (or on the surface of the tread). Some rubber compositions achieve their maximum grip at a temperature of approximately 20° C., whereas others only achieve it at approximately 120° C. Furthermore, this value of optimum temperature may vary slightly as a function of the slip and the characteristics of the ground.

The surface temperature of the tread may be measured outside the contact area of the tire. This is because the surface temperature outside the contact area is indeed linked to that prevailing in the contact area and measurement outside the contact area is relatively simple to perform. The surface temperature considered or measured may be an average over a given extent or over a limited number of points, provided that the variations are indeed representative of the variations in temperature in the contact area.

The invention also relates to a device for controlling the slip of a tire of an automobile, said device comprising at least one means capable of adjusting the slip and means for measuring a variable linked to the surface temperature of the tread of said tire in the contact area.

FIG. 1 diagrammatically represents the principle of the control device according to the invention.

Figure 1:
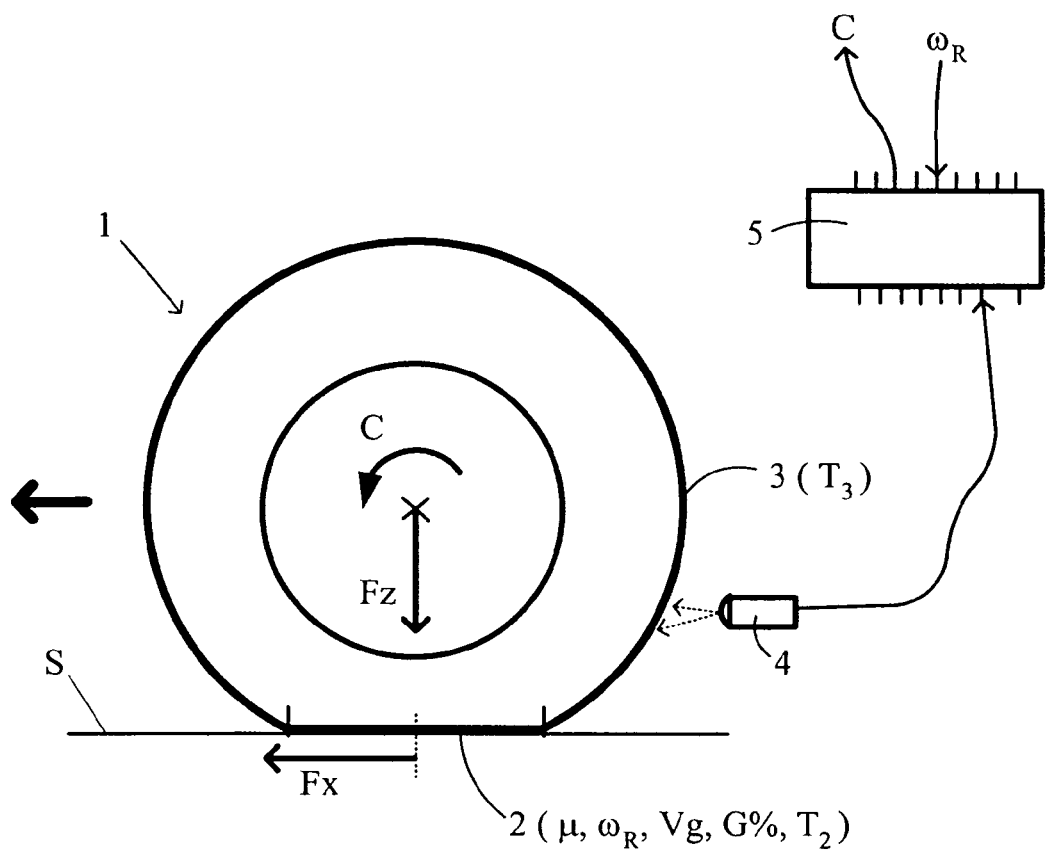

FIG. 1 shows diagrammatically a tire (1) rolling on the ground (S). This tire is subjected to a torque (C) about its axis and to a vertical load (Fz) from the vehicle which it bears (the vehicle not being shown here). The tire develops a contact area (2) by means of which the ground transmits a horizontal force, for example a solely longitudinal force (Fx), to the tire.

If one considers that the tire is rolling towards the left of the figure (as indicated by the arrow), it can be deduced therefrom that this representation corresponds to the case of application of a driving torque to the wheel. If, on the contrary, one imagines that the tire is rolling towards the right of the figure, the drawing then represents the case of application of a braking torque.

A measurement means (4), for example a thermal camera or an infrared sensor, located in the vicinity of the exit from the contact area, observes the surface of the tread (3) and provides a signal representative of the temperature of said surface. This measurement means is connected to a computer (5). This computer can adjust, for example by means of the engine management system or the braking system, the torque (C) transmitted to the wheel and/or the speed of rotation of the wheel and thus can act on the slip according to the temperature measurement.

According to the example of the representation, the surface temperature of the tread in the contact area (2) is "$T_2$", the speed of rotation of the wheel is "$\omega_R$", the slip speed is "Vg", the slip ratio is "G %", and the ratio between the force transmitted (Fx) and the vertical load (Fz) is "$\mu$".

The surface temperature ($T_3$) of the tread (3) outside the contact area is a variable correlated to the surface temperature ($T_2$) of the tread in the contact area (2). Naturally, this correlation varies in particular according to the location of the measurement. It will readily be understood that the temperature measured close to the exit from the contact area is a more reliable representation of the temperature in the contact area than a measurement effected for example close to the entry to the contact area.

The reliability of the variable ($T_3$) measured outside the contact area with respect to the surface temperature of the tread in the contact area ($T_2$) can be improved by taking into account at least one corrective variable such as the vehicle speed, the slip, the temperature of the external air or of the ground or the temperature of the air contained in the tire. However, if this measurement of surface temperature ($T_3$) is taken at the exit from the contact area, a variable which is a good representation of the temperature in the contact area ($T_2$) is already available.

Figure 2A:
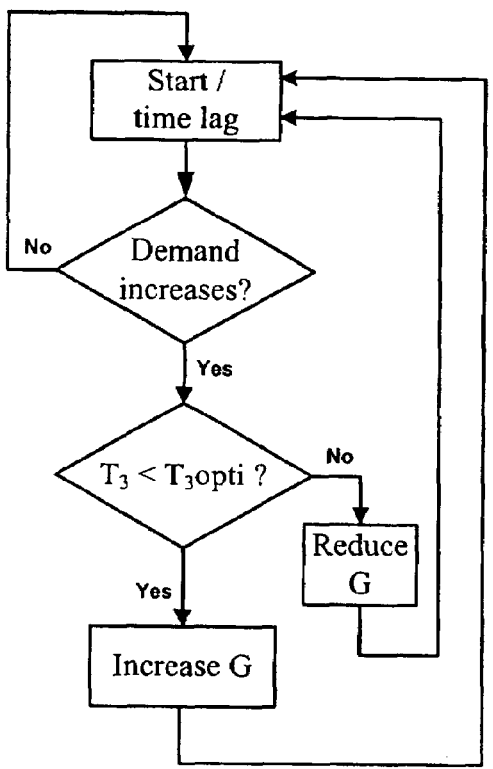
FIGS. 2a and 2b are block diagrams of examples of embodiment of the control method according to the invention.

FIG. 2a shows graphically an example of an algorithm implementing the method according to the invention.

The computer periodically (for example at a frequency of 100 Hz) or even in real time checks whether or not the braking or acceleration demand expressed by the driver is increasing. As long as the demand does not increase, no action is taken.

If the demand increases, the measured temperature ($T_3$ in this example) is compared with the desired optimum temperature ($T_3$opti in this example).

If $T_3$ is then less than $T_3$opti, this means that the grip potential ($\mu_{max}$) can be increased if the temperature in the contact area is increased. The computer then orders the actuators concerned (engine/transmission or braking system) to increase their loading on the tire in order to increase the slip (G). This increase in slip then has the consequence of increasing the temperature in the contact area ($T_2$) and thus increasing the temperature measured outside the contact area ($T_3$).

If on the other hand $T_3$ is greater than $T_3$opti, this means that the grip potential ($\mu_{max}$) can be increased if the temperature in the contact area drops. Under these conditions, the computer orders the actuators concerned (engine/transmission or braking system) to reduce their loading on the tire in order to reduce the slip (G), the consequence of which is to reduce $T_2$ and consequently $T_3$.

Figure 2B:
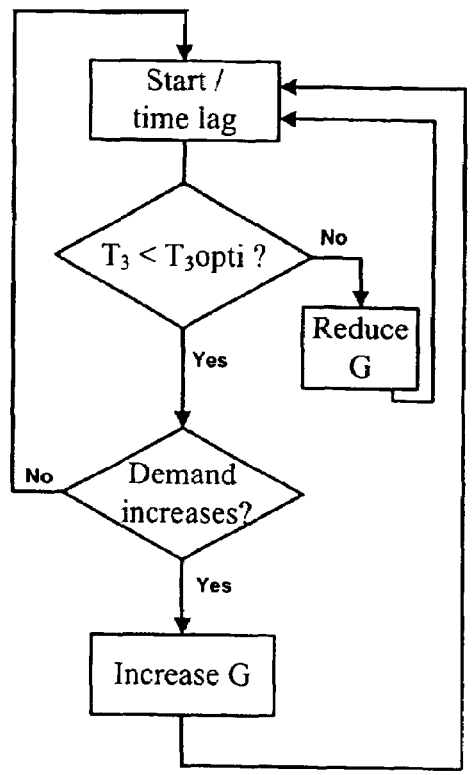

FIG. 2b shows graphically another example of an algorithm implementing the method according to the invention.

The computer compares, periodically (for example at a frequency of 100 Hz) or even in real time, the measured temperature ($T_3$) with the desired optimum temperature ($T_3$opti).

If $T_3$ is less than $T_3$opti, this means that the grip potential ($\mu_{max}$) can be increased by increasing the temperature in the contact area. If under these conditions the driver of the vehicle increases his acceleration or braking demand, the computer orders the actuators concerned to increase their loading on the tire so as to increase the slip (G). The consequence of this increase in slip is then to increase $T_2$ and consequently $T_3$.

If $T_3$ is greater than $T_3$opti, this means that the grip potential ($\mu_{max}$) can be increased if the temperature in the contact area drops. In these conditions, the computer orders the actuators concerned to reduce their loading on the tire in order to reduce the slip (G), the consequence of which is to reduce $T_2$ and consequently $T_3$. In this situation, it is not essential to take into account the intention of the driver.

The intention of the driver may be deduced (in a manner known per se) for example from the positions which the driver imposes on the accelerator and brake pedals or from the forces exerted on said pedals. Alternatively or in combination, this detection of the need to optimise the grip potential may rely on the crossing of a slip threshold, because a level of slip which is for example comparable to that at which a conventional ABS system triggers a correction may be considered as being a reliable indication of the fact that optimisation of the grip potential is desirable.

Figure 3:
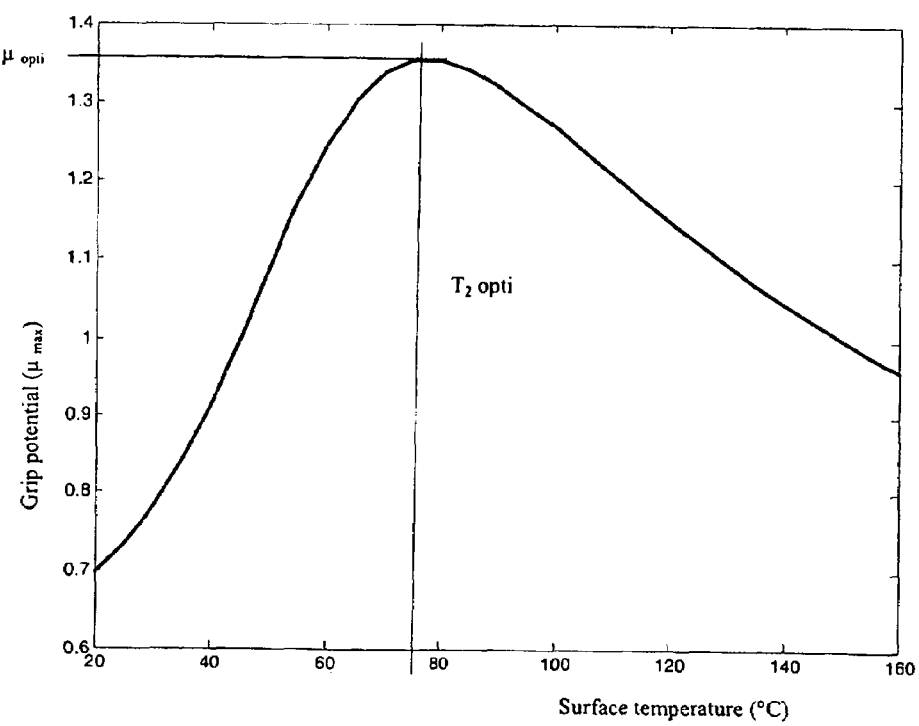
FIG. 3 is a graph showing an example of the change in the grip potential as a function of the surface temperature.

FIG. 3 is a graph showing an example of the change in the grip potential ($\mu_{max}$) as a function of the temperature ($T_2$) in the contact area. It can clearly be seen therefrom that the grip potential increases with temperature up to its optimum value ($\mu_{opti}$) for an optimum temperature ($T_2$opti). Beyond this optimum temperature, the grip potential decreases. One principle of the invention is to attempt to keep the surface of the tire in the contact area in the vicinity of this optimum temperature at least in those phases in which it is desired to transmit the greatest forces, that is to say when it is desired to have the maximum grip potential of the tire. This is generally the case for emergency braking or during powerful acceleration or pulling-away.

Figure 4:
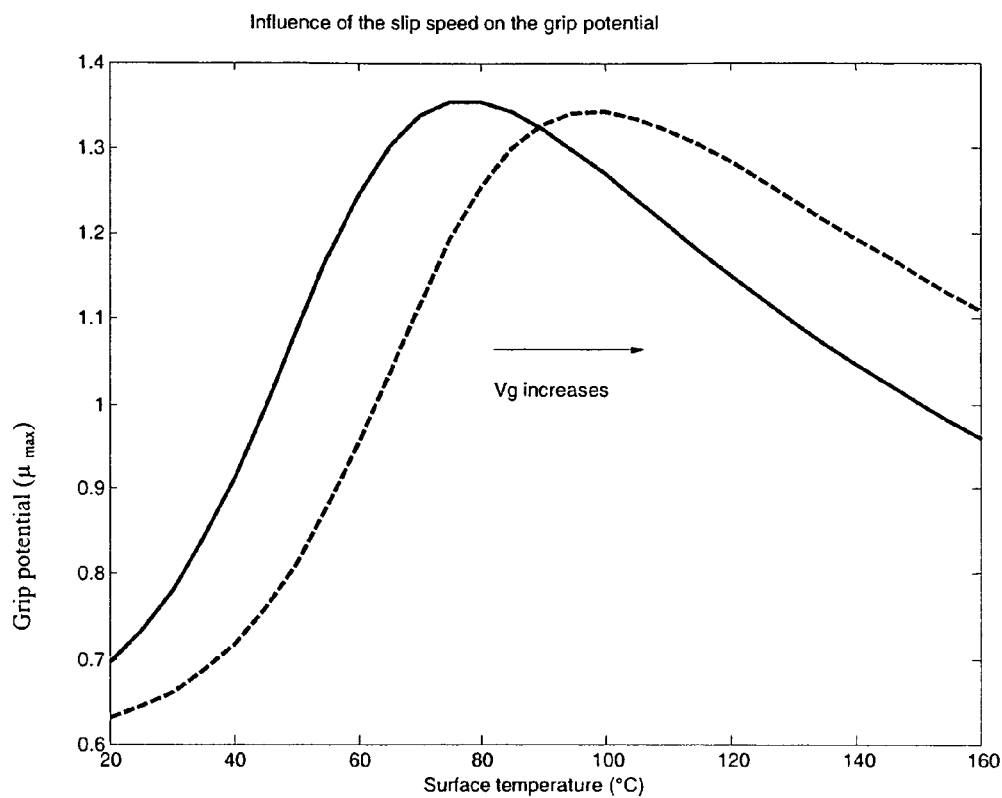
FIG. 4 is a graph allowing comparison of the change in the grip potential as a function of the surface temperature for two different slip speeds.
Figure 5:
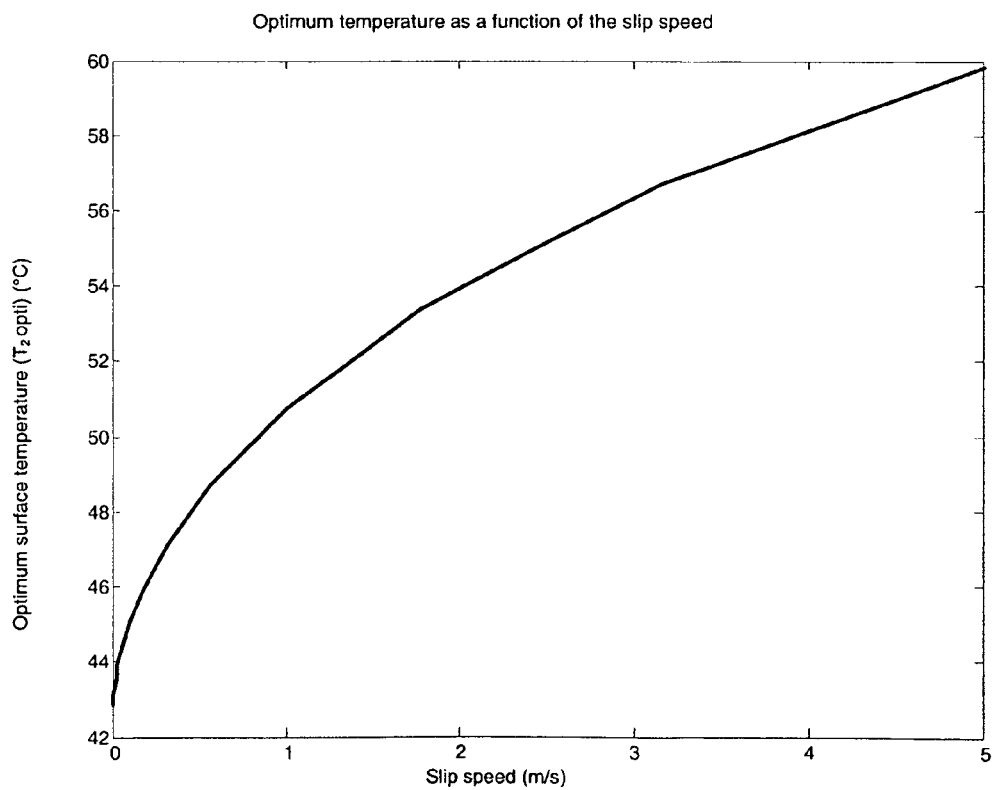
FIG. 5 is a graph showing the relationship between the optimum surface temperature and the slip speed.

FIG. 4 is a graph allowing comparison of two curves similar to the one in FIG. 3. Each curve corresponds to a different slip speed, the other conditions remaining identical. It will be noted that the two curves are offset overall relative to each other. If the optimum temperature ($T_2$opti) for each curve is observed, it will be noted that it increases when the slip speed increases. This tendency is even more clearly visible in FIG. 5, which shows an example of the change in the optimum temperature ($T_2$opti) as a function of the slip speed.

It can clearly be seen from these different curves that it may be advantageous to take into account the slip speed for determining the optimum temperature ($T_2$opti) in the contact area and hence also for determining the optimum temperature ($T_3$opti) outside the contact area, if applicable. For example, the method may comprise upon each cycle (or at a different frequency) a step in which the optimum temperature is determined as a function of the effective slip speed.

The reliability of the variable ($T_3$) measured outside the contact area with respect to the surface temperature ($T_2$) of the tread in the contact area can be improved by taking into account at least one corrective variable such as the speed of travel, the slip, the temperature of the external air or of the ground or the temperature of the air contained in the tire. However, if this measurement of surface temperature ($T_3$) is taken at the exit from the contact area, a parameter which is a good representation of the temperature ($T_2$) in the contact area is already available.

The method and the device of the invention may be used on a steering or non-steering, driving or non-driving axle. The method can be applied independently to each wheel of the vehicle or by integrating the measurements of two or more wheels for example to take account of the availability of means for controlling the torque exerted on the wheels by the engine or the brakes. The invention may in particular apply advantageously to fast, powerful vehicles.

Furthermore, if the vehicle is fitted with means for measuring its acceleration, it may be advantageous, at a given moment or periodically, to "calibrate" the calculation data used by the computer. It is in fact possible upon substantial acceleration to effect a series of measurements of the surface temperature (or of the variable linked to the temperature which is used) and in parallel a series of measurements of forces transmitted to the wheels or of measurements of the acceleration of the vehicle. It is then possible to determine for what temperature the acceleration or the force produced is effectively at a maximum and if necessary to readjust the calculation data used in controlling the slip and in particular in determining the desired optimum temperature. This calibration may for example make it possible to take into account changes in the travelling conditions (for example in the nature and state of the ground) or the change in the characteristics of the materials in contact with the ground owing, for example, to the ageing and gradual wear of the tread of the tire.

The invention applies not only to travelling in a straight line but also to travelling on bends, because, as has been seen further above, on bends the forces (F) transmitted by the tire are both longitudinal (Fx) and transverse (Fy). The grip potential is thus "consumed" at the same time by the development of the two components (Fx and Fy). However, it will be understood that, even if the control method according to the invention acts directly only on the longitudinal component of the slip, the effect of the method of the invention is to optimise the grip potential independently of the direction of loading, that is to say also the potential available for developing transverse forces.

The invention claimed is:

1. A method for controlling the slip of a pneumatic tire of an automobile and for optimizing the grip of the pneumatic tire, said pneumatic tire comprising a tread, said method comprising:
    adjusting said slip using a measurement of a variable linked to a surface temperature ($T_2$) of the tread in a contact area of the pneumatic tire, and
    adjusting said slip to bring the surface temperature ($T_2$) towards an optimal temperature.

2. The control method according to claim 1, in which said linked variable is a surface temperature ($T_3$) of the tread and is measured outside the contact area of the pneumatic tire.

3. The control method according to claim 2, in which the surface temperature ($T_3$) of the tread is measured in the vicinity of an exit from the contact area of the pneumatic tire.

4. The control method according to claim 2, in which the measurement of the surface temperature ($T_3$) of the tread is an optical measurement.

5. The control method according to claim 2, further comprising obtaining calibration data including recording a series of measurements of said linked variable and a corresponding series of measurements of forces or accelerations to which the automobile is subjected in order to determine a preferred value of calculation data used in controlling the slip.

6. A device for controlling the slip of a pneumatic tire of an automobile adapted for using the method of claim 1, said device comprising a means capable of adjusting the slip and a means for measuring the variable linked to the surface temperature ($T_2$) of the tread of said pneumatic tire in the contact area.

7. The device according to claim 6, in which the means capable of adjusting the slip comprises a means for controlling a torque supplied by an automobile engine to a wheel.

8. The device according to claim 6, in which the means capable of adjusting the slip comprises a management system for braking power or a braking torque of a wheel.

9. The device according to claim 6, in which the means for measuring the linked variable is an optical means for measuring the temperature ($T_3$) of the tread outside the contact area.

10. The device according to claim 9, in which the optical measurement means is a thermal camera placed opposite an exit from the contact area.

11. The device according to claim 6, further comprising a means for measuring acceleration of the automobile.

12. A method for optimizing the grip of a pneumatic tire comprising a tread, the method comprising:

obtaining a linked variable linked to a surface temperature ($T_2$) of the tread in a contact area of the pneumatic tire, and adjusting the slip of the pneumatic tire to bring the surface temperature ($T_2$) towards an optimal temperature with respect to the grip of the pneumatic tire, thereby optimizing the grip of the pneumatic tire.

13. The method according to claim 12, in which the linked variable is a surface temperature ($T_3$) of the tread and is measured outside the contact area of the pneumatic tire.

14. The method according to claim 13, in which adjusting the slip of the pneumatic tire comprises increasing the slip of the pneumatic tire to bring the surface temperature ($T_2$) towards an optimal temperature when the surface temperature ($T_3$) of the tread is less than the optimal temperature.

15. The method according to claim 13, in which adjusting the slip of the pneumatic tire comprises decreasing the slip of the pneumatic tire to bring the surface temperature ($T_2$) towards an optimal temperature when the surface temperature ($T_3$) of the tread is greater than the optimal temperature.

* * * * *